United States Patent Office 2,941,170
Patented June 14, 1960

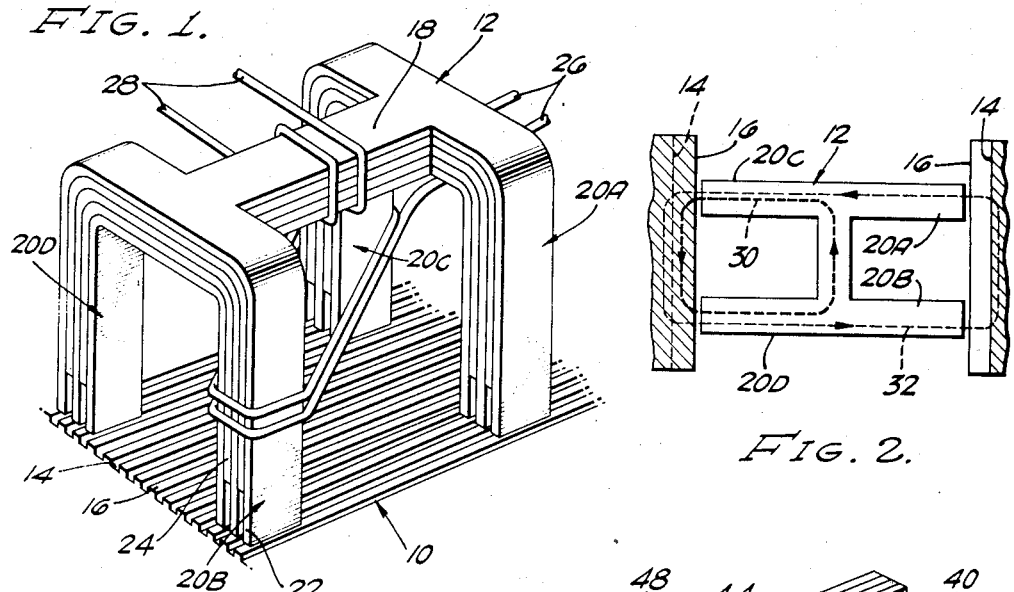
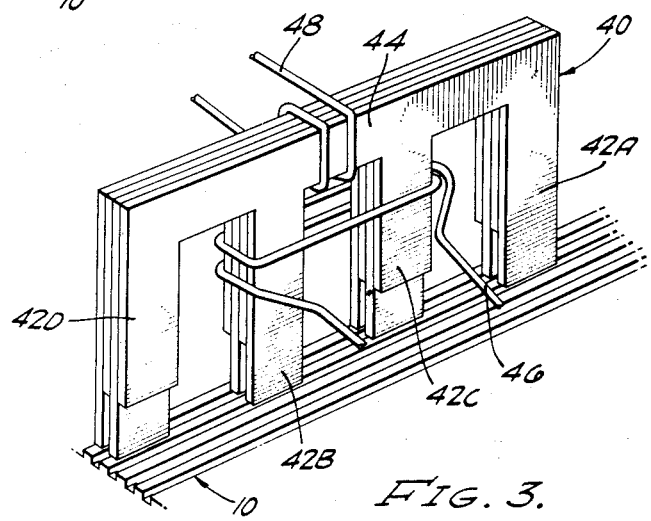
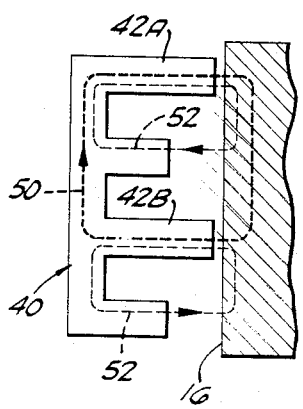

2,941,170

MOTION TRANSDUCER

Robert E. McCoy, Los Angeles, Calif., assignor to General Dynamics Corporation, Rochester, N.Y., a corporation of Delaware Filed Mar. 12, 1958, Ser. No. 720,922

6 Claims. (Cl. 336—30)

This invention relates to motion transducers and, more particularly, to improvements therein.

One of the problems which has arisen with the development of automation systems for controlling machine tools has been the determination of the new position or extent of motion which results in response to a command to execute such motion. As a result, much development activity has occurred in order to obtain a transducer which can provide a sufficiently accurate indication of either a small increment of motion or position. By way of illustration, employing a specific example, a presently developed automation system for a machine tool such as a milling machine employs a digital servoloop arrangement for controlling the position of the milling machine table. Commands in the form of pulses representative of desired increments of motion are injected into the digital servoloop. These commands are executed by motors which turn the lead screws which move the table. A motion transducer is employed to detect the number of motion increments moved by the table, and this information is compared with the number of commands being injected into the arrangement to determine whether or not they have been executed. The smaller the motion increments which can be measured by the motion transducer, the more accurately the motion of the table in response to a motion command can be controlled. Also, the finer the operations which can be performed. Thus, effectively, one of the limitations on the accuracy of the system, as well as on the type of work it can do, is the motion transducer which is employed.

An object of this invention is to provide an arrangement for a motion transducer which can measure extremely small increments of motion.

Another object of the present invention is an arrangement for a motion transducer which can accurately indicate motion increments.

Still another object of the present invention is the provision of a novel, useful, and simple motion transducer.

These and other objects of this invention may be achieved by a motion transducer which has the form of a magnetic reluctance bridge. The motion transducer will comprise a scale member, consisting of a plurality of adjacent strips or lands of high-permeability material and low-permeability material, or grooves. The transducer will comprise an arrangement consisting of at least four magnetic poles extending from a common member toward the lands and grooves of the scale. The faces of the poles adjacent the scale will have a comb-like appearance. The arrangement of the poles is such that when the teeth in the combs terminating two opposite ones of the poles are adjacent the lands in the scale the teeth in the combs terminating the remaining two opposite ones of the poles are adjacent the grooves in the scale. A primary, or input, coil is wound around one of each of the opposite poles; a secondary, or output, winding is wound around the portion common to all the poles. An excitation is applied to the primary winding, and upon motion of the transducer an output can be derived from the secondary winding which indicates the extent of the motion.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a perspective view of one embodiment of the invention;

Figure 2 is a view showing typical flux paths developed in the embodiment of the invention shown in Figure 1;

Figure 3 is a perspective view of a second embodiment of the invention; and

Figures 4 and 5 are views showing the typical flux paths obtained in the embodiment of the invention shown in Figure 3.

The transducer system to be described herein comprises two portions which are relatively movable with respect to one another. As shown in Figure 1, these will include a scale 10 and a transducer 12. Since it is necessary to couple by means of windings to the transducer 12, it is simpler to maintain this portion of the motion transducer stationary and permit the scale to move with the object whose motion is to be detected. The scale 10 may be made of a high-permeability material, in which transverse grooves 14 have been engraved, or etched, at regular intervals. The grooves may be filled with nonmagnetic material, for example, by electroplating, then grinding and polishing, to make the surface uniformly smooth and flat. Alternatively, the scale may be made of nonmagnetic material with alternate stripes in which the surface is conductive and nonconductive, for example, employing copper etching to produce grooves which then may be left empty or filled with a plastic insulating material. Otherwise stated, it is desired to provide a scale in the form of a member having alternate lands and grooves whereby there is provided alternate stripes that differ considerably in effective magnetic reluctance.

The transducer portion 12 may comprise, for example, a common member 18, from which there extends four poles 20A, 20B, 20C, and 20D. The transducer has the form of an H with the arms adjacent the crossbar bent until the two upper arms are adjacent grooves 14. The transducer is made of a plurality of laminations. Only a few laminations are shown in the drawing, to simplify the drawing and the explanation. A unit designed for very fine resolution may have as many as several hundred laminations. The laminations are made of a material having a high magnetic permeability.

The spacing of the laminations in the transducer core matches as closely as possible the spacing of the grooves or of the lands between the grooves, but this match is specified for the sake of sensitivity only; the average spacing of grooves and lands in the scale under the transducer pole tips is what governs the accuracy of position measurement. It will be seen that the laminations 22 are spaced, preferably by short laminations 24, so that the pole tips have a comb-like appearance or profile and, as previously indicated, the long laminations are bent so that the poles 20A, 20B are adjacent the lands in the scale when the poles 20C, 20D are positioned over the grooves. The spaces between the teeth in the comb may be left with only air between them, or for the sake of rigidity may be held apart by some convenient plastic filler. Alternative to any of the above, the spaces may be filled by conductive laminations so insulated as to inhibit by eddy currents any tendency of the magnetic flux to spread from the teeth into the adjacent gaps (where the conductive laminations are) but never form a closed loop about any desired flux path (such as the tip of a magnetic lamination).

There are two windings required. An input, or primary, winding 26 may consist of one, two, or four symmetrically placed coils on the poles, so connected that they tend to drive magnetic flux up one pole and down another in two pairs oppositely polarized with respect to the cross member 18. The secondary, or output, winding 28 may consist of one or more turns on the cross member. A carrier current, having a medium frequency on the order of 600 kc. per second, for a transducer using 0.0002" laminations, or on the order of 200 kc. per second for a transducer using 0.001" lamination, may be applied to the primary winding. The primary winding will produce corresponding magnetic flux through the poles. The four poles of the transducer and the portions of the scale next to the pole tips form a magnetic reluctance bridge with reluctances varying inversely as the length of non-magnetic material in the flux path. If the bridge is unbalanced, as it will be when one pair of legs has long laminations aligned with the lands of the scale, while the other pair has long laminations aligned with the grooves, some flux links the secondary coil. The net secondary flux linkages will vary periodically if the transducer moves along the scale, going through a full cycle in the distance between the centers of two adjacent grooves or two adjacent lands. In each cycle, the coefficient of coupling between the primary and secondary windings varies from a maximum of one polarity through zero to a maximum of the opposite polarity and back again.

Figure 2 shows typical flux paths which are obtained with the transducer shown in Figure 1. Assuming that the poles 20C, 20D have their tips over lands and the poles 20A, 20B have their tips over grooves, then the majority of flux obtained from the carrier current flowing through the primary winding will take the path 30, represented by the heavy dashed lines through the poles 20C, 20D and the land 16. A leakage path is represented by the light dashed line 32. As the scale is moved so that a groove is under the comb-like pole tips 20C, 20D, and a land comes under the pole tips of the poles 20A, 20B, the heavy dashed line flux path 30 may be drawn through these latter two poles instead of in the manner shown in Figure 2.

Reference is now made to Figure 3, which is a view in perspective of another preferred embodiment of the invention. The scale 10 may be identical with the one shown in Figure 1. The transducer portion of the motion transducer also comprises a plurality of laminations of high magnetic permeability. Each one of these laminations 40 will have what may be considered two opposite long legs 42A, 42B, and two opposite short legs 42C, 42D, extending from a common member 44. As is shown in Figure 3, each one of these laminations is positioned adjacent another lamination which has its short legs next to the long legs so that four poles are formed extending from the common member 44, which have comb-like pole tips. In view of the fact that the thickness of these laminations is made on the order of the lands or grooves, the two opposite poles, including the legs 42A, 42B, will be over the lands in the scale when the two opposite poles, including the legs 42C, 42D, are over the grooves in the scale. An input or primary winding 46 is wound over two of the opposite poles, and a secondary winding 48 is wound over the portion of the common member common to both pairs of poles.

In operation, the primary winding is excited by a carrier current similar to that described for the embodiment of the invention shown in Figure 1. Figure 4 and Figure 5 show the flux paths which can be expected as the scale is moved past the transducer. In Figure 4 there is shown a side view of the scale 10 and transducer 40, with the poles including the legs 42D and 42C being positioned over lands. The main flux path 50 thus passes through these two poles. Two minor, or high-reluctance, flux paths are represented by the light dashed lines 52 and 54. When the poles, including the legs 42A and 42B, are positioned over a land, then the main flux path 50 shifts to pass through these two poles and reverses direction through the portion of the common member over which the secondary winding 48 is wound. Accordingly, as the scale and transducer are moved relative to one another, a voltage will be induced in the secondary winding at the exciting frequency and varying from a maximum of one polarity through zero to a maximum of the opposite polarity with continued motion.

In order to use either of the above-described magnetic transducers in a position-measuring system, two transducers may be mounted together, with their pole tips adjacent the same scale, but with corresponding points of their respective poles spaced an odd number of quarter cycles of the groove-and-land scale pattern. The two secondary windings (or the two primaries) may be connected in series; then, from its electrical terminals, the combination will appear substantially equivalent to a resolver of the type having one secondary and two primary windings, or vice versa, and it may be used in any of the circuit arrangements that have been devised for servo systems using such resolvers.

There has been accordingly described and shown herein a novel, useful, and relatively simple high-precision linear-position transducer. Although the embodiment of the invention is shown for determining linear motion, this is not to be construed as a limitation upon the invention, since it is an obvious expedient to move the scale in a rotary manner, and the extent of such motion can be readily detected using this invention.

I claim:

1. A motion transducer comprising a relatively movable scale and transducer, said scale comprising alternate strips of material of relatively high and low magnetic permeability; said transducer being made of a material having a high magnetic permeability and having the form of four spaced poles extending from a common member toward said scale, the ends of said poles having lands and grooves, a first pair of said poles extending from said common member a distance to position the lands in the pole ends opposite said strips of relatively high permeability material, a second pair of said poles extending from said common member a distance to position the lands in the pole ends opposite said strips of relatively low magnetic permeability, an input winding wound around one of each of said first and second pairs of poles, and an output winding wound over said common member.

2. A motion transducer comprising a relatively movable scale and transducer, said scale comprising alternate grooves and lands, and being made of material having magnetic permeability; said transducer comprising a stack of magnetic laminations in the form of four poles extending from a common member toward said scale, each of the laminations of said stack of laminations being adapted to extend into and end in each of said four poles, the lamination ends in two opposite ones of said poles being positioned over said lands when the lamination ends in the remaining two opposite ones of said poles are positioned over said grooves, a primary winding wound over one of said poles with its lamination ends positioned over said lands and one of said poles with its lamination ends positioned over said grooves, and an output winding wound over said common member.

3. A motion transducer as recited in claim 2 wherein each of said laminations has a comb shape with alternate long and short teeth, each of the laminations in said stack having their short teeth adjacent the long teeth of each of the other laminations on either side.

4. A motion transducer as recited in claim 2 wherein each of said laminations has an H shape, the crossbar of said H is maintained parallel to said scale, the portion of each arm on one side of the crossbar of said H being bent until the tips are opposite a land, the portion of each arm on the other side of the crossbar of said H being bent until the tips are opposite a groove.

5. A motion transducer as recited in claim 2 wherein the grooves of said scale are filled with a material having substantially little magnetic permeability to present a smooth surface with said lands.

6. A motion transducer comprising a relatively movable scale and transducer, said scale comprising alternate grooves and lands, said transducer comprising a stack of laminations of a high magnetic permeability material in the form of four poles extending from a common member toward said scale, each of the laminations in said stack of magnetic laminations being adapted to extend into and end in each of said four poles, the lamination ends in two opposite ones of said poles being positioned over said lands when the lamination ends in the remaining two opposite ones of said poles are positioned over said grooves, a primary winding wound over one of said poles with its lamination ends positioned over said lands and one of said poles with its lamination ends positioned over said grooves, and an output winding wound over said common member.

References Cited in the file of this patent

UNITED STATES PATENTS 2,848,698    Howey _____ Aug. 19, 1958